United States Patent [19]

Welker

[11] Patent Number: 4,678,290

[45] Date of Patent: Jul. 7, 1987

[54] APPARATUS FOR VISUAL INSPECTION OF CLOSED MACHINERY

[75] Inventor: Robert H. Welker, Sugar Land, Tex.

[73] Assignee: Welker Engineering Company, Sugar Land, Tex.

[21] Appl. No.: 771,349

[22] Filed: Aug. 30, 1985

[51] Int. Cl.⁴ .................. A61B 1/00; G02B 23/00; F21L 7/00; F21V 29/00

[52] U.S. Cl. .................. 350/506; 362/158; 362/267

[58] Field of Search ............ 362/158, 267; 350/501, 350/618, 623, 624, 506

[56] References Cited

U.S. PATENT DOCUMENTS

| | | | |
|---|---|---|---|
| 2,028,430 | 1/1936 | Baddorf et al. | 350/506 |
| 2,251,739 | 8/1941 | Huntsinger . | |
| 2,363,701 | 11/1944 | Soetbeer . | |
| 2,437,458 | 3/1948 | Crampton | 350/506 |
| 2,553,307 | 5/1951 | Falge | 362/158 |
| 2,609,728 | 9/1952 | Cadwell . | |
| 2,898,856 | 8/1959 | Shull . | |
| 3,042,797 | 7/1962 | Rubens | 362/158 |
| 3,155,761 | 11/1964 | Rubens et al. . | |
| 3,297,022 | 1/1967 | Wallace . | |
| 3,450,481 | 6/1969 | Kramp et al. . | |
| 3,496,348 | 2/1970 | Lowery . | |

OTHER PUBLICATIONS

Olympus Corporation, "The Inside Story—Focus on Inspection", p. 2, The AXL-100 Explosion-Proof Light Source", 1984, apparently published in the U.S.A.
Olympus Optical Co., Ltd., "Olympus Industrial Fiberscopes Model IF", pp. 1-8, date unknown, printed in Japan.
Olympus Corporation, "New Olympus Mark II Borescopes", pp. 1-4, date unknown, printed in the U.S.A.
Lenox Instrument Company, "Lenox Explosion-Proof Borescope Light Source", pp. 1 and 2, 1983, printed in the U.S.A.
Lenox Instrument Company, "Lenox Extendable Borescopes", pp. 1-6, date unknown, apparently published in the U.S.A.
Lenox Instrument, "View-A-Pipe", pp. 1 and 2, date unknown, apparently published in the U.S.A.
Applied Fiberoptics, Inc., "Clad Rod", p. 1, date unknown, apparently published in the U.S.A.
Applied Fiberoptics, "Your Imagination is Our Only Limitation", pp. 1 and 2, date unknown, apparently published in the U.S.A.
Applied Fiberoptics, "The Clear Choice in Fiberoptics", pp. 1-6, date unknown, apparently published in the U.S.A.
Applied Fiberoptics, Inc., "Fiberoptic Light Guides, Assemblies, Light Sources, Custom Design Services", pp. 1-4, 1982, printed in the U.S.A.
Richard Wolf Medical Instruments Corp., "Borescope Light Projectors", 1980, printed in the U.S.A.
Richard Wolf GMBH, "Wolf Technoscopes", pp. 1-31, date unknown, place of publication unknown.
AO Scientific Instruments, "Two Borescopes in One", pp. 1 and 2, date unknown, printed in the U.S.A.
AO Scientific Instruments, "AO Micro Fiberscopes", pp. 1 and 2, date unknown, printed in the U.S.A.
AO Scientific Instruments, "AO Flexible Fiber Optic Long Fiberscope 29 Ft.", pp. 1 and 2, date unknown, printed in the U.S.A.
Dainichi-Nippon Cables, Ltd., "Diaguide Scope", pp.
(List continued on next page.)

Primary Examiner—John K. Corbin
Assistant Examiner—Vincent J. Lemmo
Attorney, Agent, or Firm—Gunn, Lee & Jackson

[57] ABSTRACT

For use in inspecting the interior pipelines and other machinery subjected to risk of explosive gasses, an improved explosive proof apparatus is disclosed. The apparatus includes a periscope assembly having an optical system and lamp sealed therein for viewing a specified area subject to illumination by the lamp. Moreover, a separate battery pack is included. A flow of nitrogen gas is delivered to the battery pack and periscope to surround the electrical components to thereby prevent explosion.

17 Claims, 4 Drawing Figures

OTHER PUBLICATIONS 1-13, date unknown, printed in Japan.

Titan Tool Supply Company, Inc. "G Miniature Series Borescopes", pp. 1-4, Jul. 1, 1983, apparently printed in the U.S.A.

Karl Storz Endoscopy-America, Inc. "Illumination/Documentation Catalog 1984 Ed.", pp. 1-21, 1984, place of printing unknown.

Karl Storz GmbH & Co., "Hopkins Rod Lens Telescope Instruction Manual", pp. 1-12, date unknown, place of printing unknown.

Dolan-Jenner Industries, Inc., "Electronic Controls Fiber Optics", pp. 1-31, date unknown, apparently printed in the U.S.A.

Fiberoptics Technology Incorporated, untitled catalog, pp. 1-7, date unknown, printed in the U.S.A.

Reichert Fiber Optics, "Reichert Fiber Optics Flexible Industrial Fiberscope Model FS-2102", pp. 1 and 2, date unknown, printed in the U.S.A.

Reichert Fiber Optics, "Reichert Fiber Borescope Model FB 250A and FB 550", pp. 1 and 2, date unknown, printed in the U.S.A.

Reichert Fiber Optics, "Reichert Illuminations", pp. 1 and 2, date unknown, printed in the U.S.A.

APPARATUS FOR VISUAL INSPECTION OF CLOSED MACHINERY

BACKGROUND OF THE DISCLOSURE

This apparatus is directed to inspection equipment for observation of the interior of closed machinery. In particular, as it intended to be used in an atmosphere which runs the risk of explosion. As set forth in Baddorf, U.S. Pat. No. 2,028,430, a danger exists in placing a high voltage lamp in an explosive atmosphere (a fuel storage tank in that instance). That disclosure mentions placing a lamp in a vapor proof chamber. The later patent of Crampton (U.S. Pat. No. 2,437,458) sets forth an open light display on an inspection periscope having an optical system. The unobvious apparatus of this disclosure is a device which enables the interior inspection of closed machinery subject to the possibility of an explosive atmosphere. The present device comes in a form having relatively a narrow dimension with an elongate cylindrical shape, and is particularly able to be positioned in a potentially explosive atmosphere without risk of explosion. The device incorporates an optical system which has an external eye piece which provides a magnified view through the optical system. There is an external opening from the structure (in conjunction with a mirror) which directs the field of view along a specified azimuth. The device has an elongate cylinder housing and is therefore able to be inserted through a drilled hole and rotated for inspection in several directions. It incorporates a mirror directed for inspection in a given direction; in like fashion, a similar mirror set at a similar angle having a common azimuth enables illumination in the same direction. This mirror reflects light from a lamp in a closed housing.

The possibility arises that an explosion might occur. The lamp is electrically powered, and to this end, suitable electrical conductors are connected with the lamp. Even so, the lamp is able to be used safely because the appartus includes a nitrogen supply delivering nitrogen under pressure to the vicinity of the lamp to fill the closed and sealed chamber. This constitutes a nonexplosive atmosphere. In the unlikely event that a spark occurs around the electrical apparatus within the equipment, there is no explosion because the entire atmosphere near the lamp is nitrogen.

The periscope further utilizes a remote battery pack. The battery pack includes a closed and hermetically sealed housing. Suitable batteries and switch gear are protected in this housing. The nitrogen supply system is connected to this housing and thereby delivers nitrogen to the vicinity of the battery pack so that all this equipment is protected by a nonexplosive atmosphere. Accordingly, the entire system of equipment is protected and made safe from explosion or inadvertent electrical spark which might potentially trigger an explosion.

While the foregoing sets forth the problem in context of the application of this apparatus and mentions certain important features of the apparatus, a better understanding of the apparatus will be obtained on a review of the below written specification in conjunction with the drawings.

DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED AND ILLUSTRATED EMBODIMENT

Figure 1:
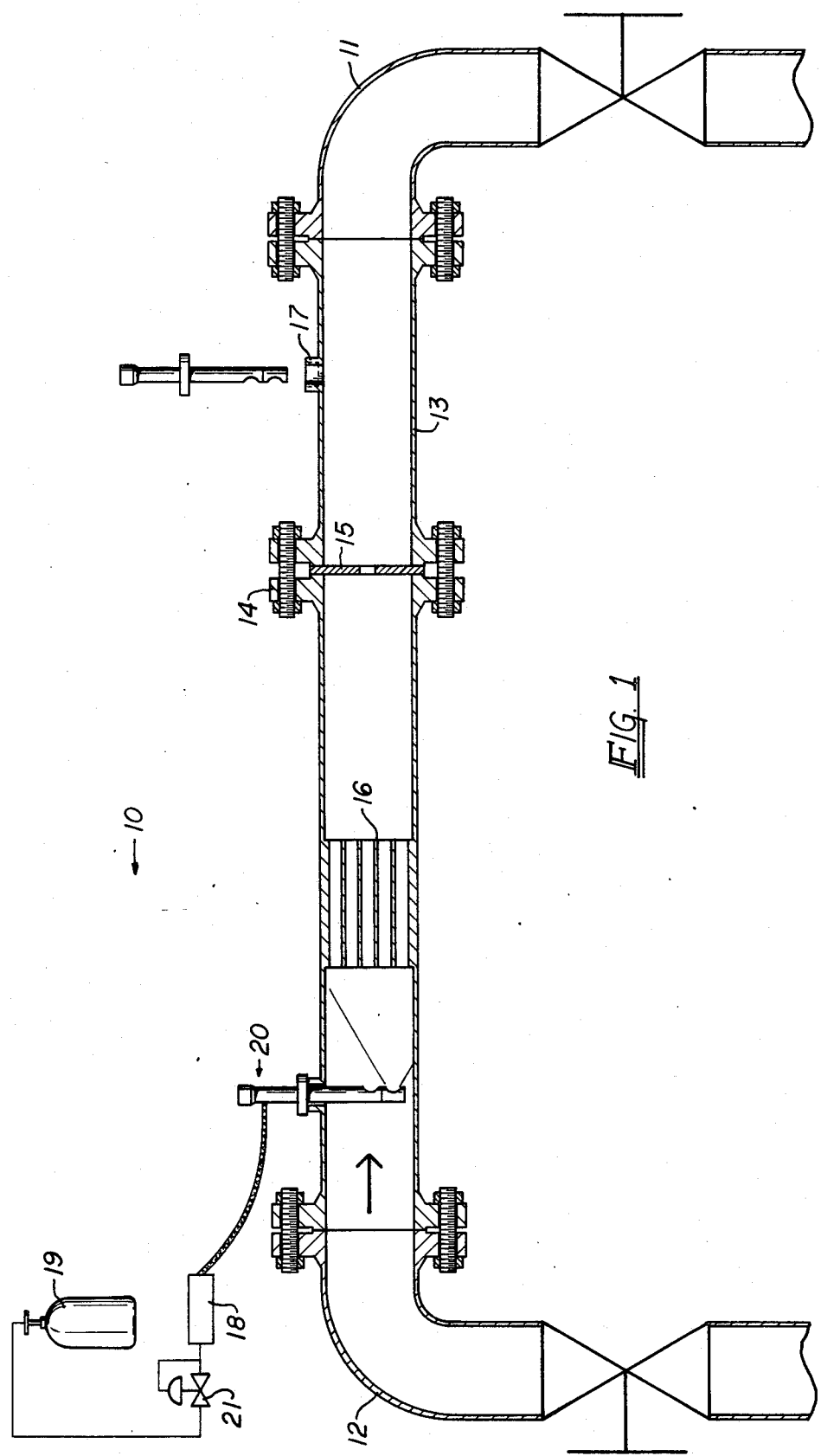
FIG. 1 shows the explosion proof inspection apparatus of the present disclosure for inspecting the interior of a meter run pipe system, the present apparatus being inserted through an insertion opening and being operated under positive supply of nitrogen gas to suppress the risk of electrical spark and explosion.

Attention is first directed to FIG. 1 of the drawings where the numeral 10 identifies the inspection apparatus of this disclosure. It will be placed in the context of an inspection job so that its mode of operation will be more readily understood. To this end, the numeral 11 identifies an elbow aligned with an opposing elbow 12, there being a straight length pipe there between identified at 13. This is typically described as a meter run. It incorporates flanges at 14 which clamp or hold a meter orifice plate 15 which constricts flow. The meter orifice is used to measure the flow through the pipe system shown in FIG. 1. Upstream of the orifice, there are several straightening vanes 16 which extend along the length of the pipe. For purposes of inspection, the numeral 17 identifies a small capped port which is located downstream of the orifice plate 15. It is conveniently plugged and sealed ordinarily but it is opened to enable the present apparatus to be inserted through the opening to inspect the interior of the pipe. A similar opening is provided upstream. The present apparatus is adapted to be inserted through openings of this sort to view the interior. Presumably, the present apparatus is used after the interior of the pipe has been evacuated. That is, it is used in an unpressurized atmosphere. For convenience sake, the device can be held steady by means of a suitable clamp assembly which affixes the periscope to be described. This avoids the possibility of vibration in the event the device were hand held. Hand operation, however, should not be considered as a detriment.

The present apparatus thus includes an assembly described as the periscope and more particularly identified at 20. This operates in conjunction with a battery pack assembly 18 on the exterior. This battery pack provides electrical power for operation of the lamp in the periscope. More will be noted regarding both the assemblies 18 and 20 hereinafter. An important feature shown in FIG. 1 is the incorporation of a nitrogen bottle 19. Through use of a suitable gas flow regulator 21, nitrogen is introduced at a positive pressure to the interior of the battery pack 18. It is connected by a suitable line to the periscope and delivers nitrogen to that assembly also. The positive pressure replaces the atmosphere in both devices and assures that the electrical components are surrounded by an atmosphere of nitrogen. Nitrogen is the preferred low cost explosion suppressing gas.

DESCRIPTION OF THE POWER PACK

Figure 2:
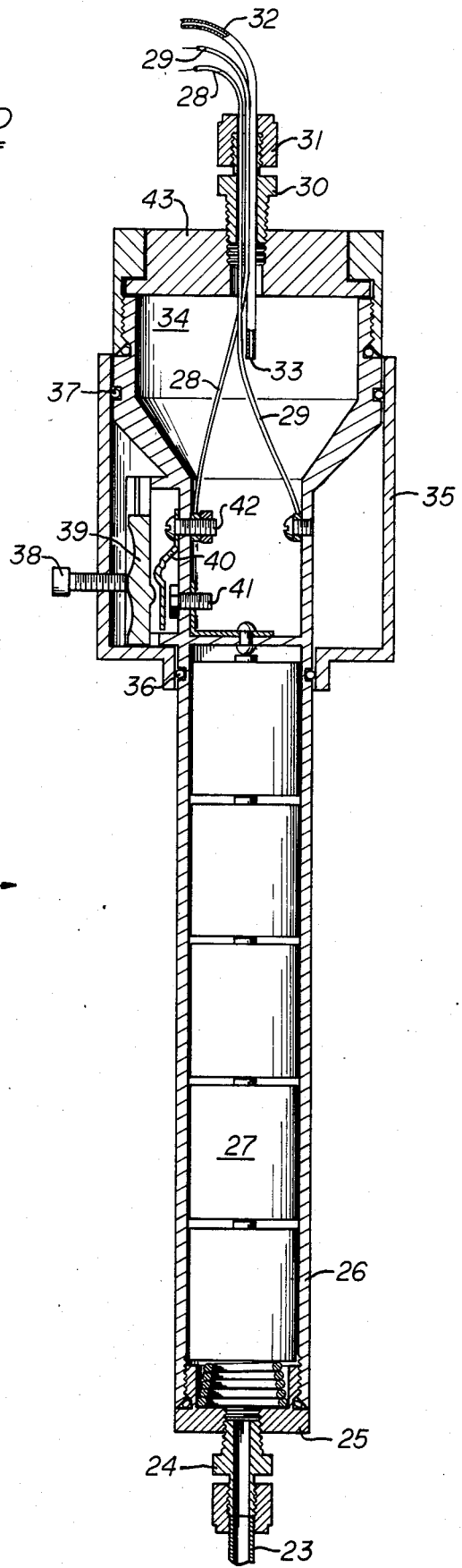
FIG. 2 is a sectional view through a battery pack utilized with the present apparatus featuring an explosion proof construction and a sealed housing adapted to receive nitrogen to suppress the possibility of a spark or explosion.

In FIG. 2 of the drawings, the numeral 23 identifies a hose or tubing from the nitrogen control regulator 21, the tubing being joined by suitable fitting 24 to a closure cap 25. The cap 25 is spring loaded, and is threaded to an elongate cylindrical body 26. The body 26 encloses several batteries 27 connected serially. The several batteries 27 provide suitable voltage across a pair of conductors 28 and 29. The conductors 28 and 29 connect with suitable mounting posts to enable electrical connection with the batteries 27. The conductors 28 and 29 extend through a hollow fitting 30 which connects with a threaded coupling 31 to seal the battery pack. The coupling encloses and seals around the conductors 28 and 29. In addition, a small tubing 32 opens at the end 33 in the battery pack 18 to receive nitrogen. The tube 32 extends to the apparatus shown in FIG. 3 as will be described.

There is a nitrogen flow path where nitrogen introduced from the tubing 23 at the lower end of FIG. 2 flows past the batteries and fills the interior housing of the battery pack 18. Moreover, it fills the upper portion of the housing including the chamber area 34 shown at the top end of the equipment. This enables nitrogen gas to flow into the tubing 32 which extends to the remainder of the equipment to deliver nitrogen gas to other components of the equipment.

The battery pack 18 is conveniently converted from a large flashlight housing. It is normally equipped with a switch. The switch is modified to make sure that it is explosion proof in construction. An axially hollow sleeve 35 is fitted over the end of the flashlight housing. A seal 36 is included to prevent leakage to the interior of the cylindrical sleeve 35. A similar seal 37 at the upper end completes the sealing arrangement. A switch is enclosed on the interior of the cylindrical sleeve. The switch is operated by rotating a threaded screw 38. The head is knurled or otherwise slotted to enable easy engagement. In turn, it operates by pushing against a detent actuator 39. the actuator presses against a spring loaded switch member 40. When the switch member 40 is pressed downwardly, it contacts flat headed screw 41 to complete a circuit. This applies current to the conductor 28 connected electrically to the mounting screw 42. The switch is opened by unthreading or releasing the bolt 38.

A closure member 43 closes over the upper end of the flashlight housing. It is axially drilled at the center to permit the communication necessary to operate the periscope as will be described. In summary, the structure shown in FIG. 2 functions as a battery pack and yet is made safe and secure. The safety is provided by utilizing this arrangement whereby any possibility of spark is covered in a blanket of nitrogen which thereby prevents explosion. Moreover, nitrogen is introduced continuously through the regulator 21 and into the tubing 23 and flows out of the tubing 32 to the remainder of the equipment. As will be observed in the foregoing description, the entire structure shown in FIG. 2 comprises an explosion proof housing.

DESCRIPTION OF THE PERISCOPE

Figure 3:
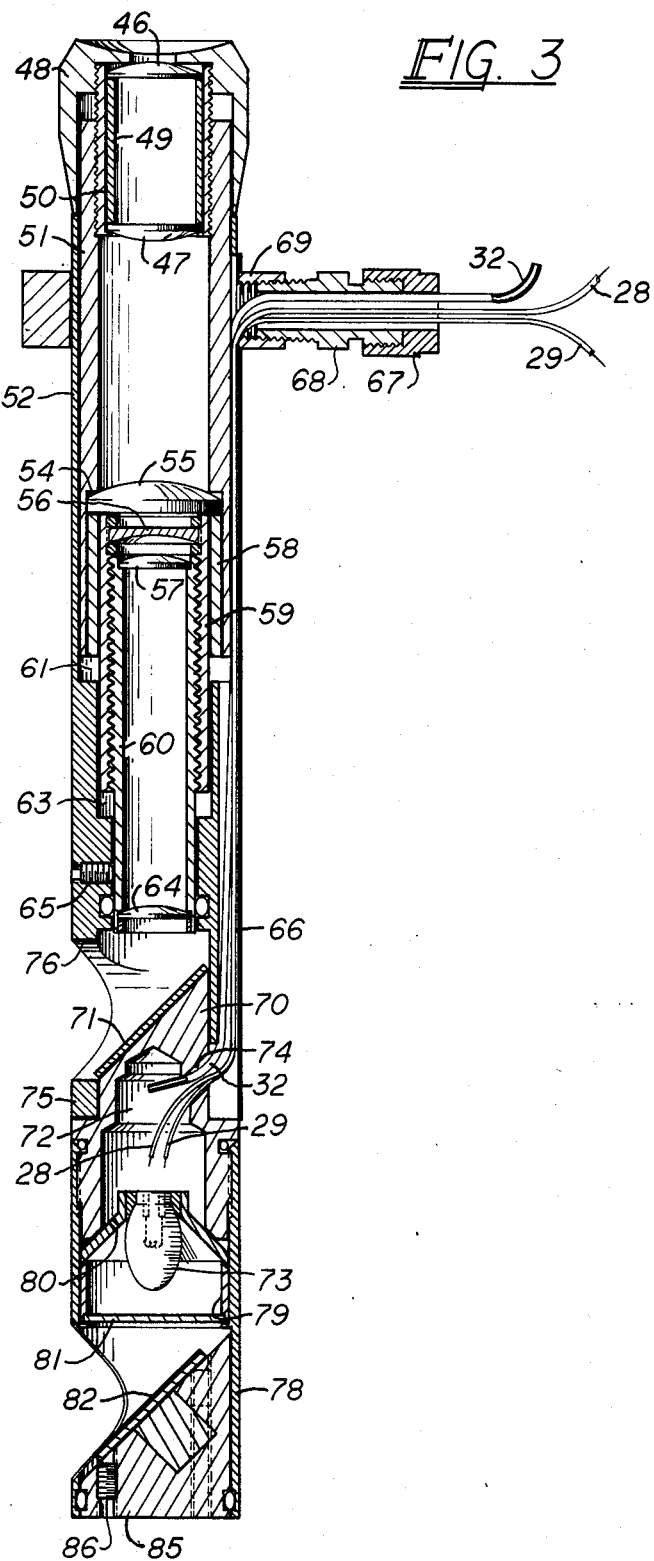
FIG. 3 is a sectional view through a periscope insertion apparatus and includes details of construction of the optical system and lighting system.

Attention is next directed to FIG. 3 of the drawings. Here, the periscope apparatus 20 is shown in greater detail. This equipment, proceeding from the top end, utilizes an optical eye piece 46 in conjunction with a cooperative lens 47. The lenses 46 and 47 are mounted immediately interior of a surrounding external fitting 48. The fitting 48 closes over and supports the optical lenses on the interior. In turn, they are spaced from one another by a cylindrical spacer 49. The spacer 49 is on the interior of a sleeve 50, that being threaded to a larger and longer sleeve 51. On the exterior, there is a sleeve 52 which completes the structure at the upper end. Briefly, a solid external housing is utilized to enclose the various optical pieces which make up the eye piece system. The portion of equipment described at this juncture may be generally described as the eye piece. That is, it provides an opening at the upper end where an individual can peer through the eye piece to the interior and thereby utilize the optical system for making observations. Further, the optical system is rigidly supported to avoid unintended misalignment. It is shielded by virtue of the fact that the components surrounding the optical path are held within the opaque housing. Last of all, it should be noted that the components are constructed for telescoping so that the focal length of the optical system can be adjusted. The term optical system thus refers to the components 46 and 47 in conjunction with the additional optical components to be described. The eye piece is that portion including the lenses 46 and 47.

The housing member 51 is counterbored to define an internal shoulder 54. The shoulder is used to register an optical component or lens 55. In turn, that lens cooperates with additional lenses 56 and 57. These three lenses are supported on selected shoulders at the ends of a set of sleeves. The numeral 58 identifies the outer sleeve which is located on the interior of the sleeve 51 there around. The next sleeve on the interior is identified by the numeral 59, while the smallest sleeve 60 is located on the interior of that sleeve. The sleeves 58 and 60 terminate to define supportive shoulders for the components 55, 56, and 57. It will also be observed that there is a gap 61 where the sleeves terminate on the interior of the outer member 52. In turn, another shoulder defines another internal cavity 63. The two sleeves 59 and 60 thread together to define telescoping movement. This will be described in detail.

The optical path incorporates the bottom lens 64. That lens is held in position by means of a sleeve adjacent to it, being received at the lower end of the smallest concentric tubular member 60. The optical path thus begins with the eye piece at the upper end of the structure and also includes the lenses 55, 56, 57, and 64. Collectively, all form the optical system within the housing. The housing components are joined by threads as shown and also by a lock screw 65. The lock screw fixes the components together so that the external and innermost cylindrical members are locked to one another. Axial movement for focus purposes is achieved by adjusting the position of the lenses in the optical system to thereby vary the focal length. That is to say, the field of vision is focused by these adjustments. The lock screw 65 is incorporated to fix the components relative to the housing so that an optical adjustment can be made and fixed, slippage being prevented by the lock screw. The sleeve 59 threads to the smaller sleeve 60.

The sleeve 60 is fixed by the lock screw 65 so that the lenses 57 and 64 do not move. Rotation of the eye piece rotates the sleeve 51 and in turn rotates the sleeve 59 to thereby raise the eye piece and also the two lenses 55 and 56 with the eye piece. this alters the optical system focal length.

A slot is cut along the backside of the outer sleeve 52 at 66. The slot 66 enables the various conductors to extend along the length of the periscope 20. The conductors 28 and 29 thus pass through the lock fitting 67 which in turn threads to the fitting 68. That threads to a ring shaped collar 69 joined to the exterior of the housing. The three conductors and tubing bend and fold into the slot 66. The conductors extend along the slot 66 until they turn inwardly of the equipment to a lamp mounting 70. The mounting 70 has a planar upper surface cut at an angle to support a mirror 71. The mirror is positioned adjacent to the optical system to deflect the field of view away from the periscope. The mirror 71 is positioned to determined an azimuth of the view. The bulb mounting 70 is axially drilled to define an interior axial hollow passage 72, this being provided to receive a light bulb 73. The mounting 70 is laterally drilled with a hole or passage 74 enabling the conductors 28 and 29 to extend to the bulb 73. Moreover, the tubing 32 extends into this area also. It introduces nitrogen around the bulb 73. Briefly, the bulb 73 is supported by the mounting 70, this being surrounded by a blanket of nitrogen to prevent spark and explosion. Moreover, should spark occur, it will not combust because it is surrounded by the nitrogen atmosphere.

Figure 4:
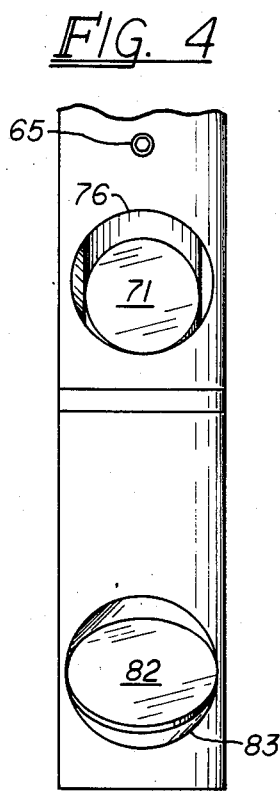
FIG. 4 is a view of the ports in the periscope of FIG. 3 showing the alignment of the optical system and illumination system which are directed along a specific azimuth.

The mounting 70 is held in place within the external sleeve 52 which terminates at the ring shaped shoulder 75. It is drilled thereabove with a hole 76; the hole is better shown in FIG. 4 to comprise a circular hole. As will be understood, a circular hole drilled with a round cutting tool on the surface of a cylinder has a non-circular appearance. It is distorted by the shape of the curving surface. As shown in FIG. 4, the mirror 71 is positioned in the opening 76 to direct vision to the side of the periscope. Further, the mounting 70 is enclosed within a lower external housing member 78. This member is in the form of a sleeve surrounding an internal cone shaped reflector 79. The cone shaped reflector 79 fits about the bulb 73 and preferably has a mirrored surface to reflect the light. A breather port 80 is drilled through the cone shaped rreflector 79 to enable the nitrogen around the base of the lamp 73 to fully surround the lamp. The cone shaped reflector 79 supports a clear lens 81. Light is directed downwardly to a mirror 82. The mirror 82 directs light to the side of the periscope 20 through a hole 83. The hole 83 is formed in the exterior of the lower housing member 78 and is similar to the hole 76 thereabove. The mirror 82 rests at an angle selected to direct light to the side. This angle is defined by the slopping surface on the end plug member 85. Through suitable threaded support plugs 86, the angle of the mirror can be slightly adjusted. The plugs located just below the mirror 82 and bear against the mirror to reposition the mirror. The plugs 85 are threaded to the end plug member 78. The mirror is preferably formed on a metal plate held in position by magnetic attraction. The attractive force jams the mirror against the plugs 86; they are moved to adjust the tilt of the mirror 82.

The periscope shown in FIG. 3 is used in the following fashion. First of all, it is furnished with electrical power from the battery pack 18 shown in FIG. 2. Additionally, there is a regular flow of nitrogen gas through the tube 32. The nitrogen is introduced into the vicinity of the lamp 73. It surrounds the base of the lamp and also the entire glass envelope. This enables the lamp to operate fully surrounded in a safe atmosphere. Even if the lamp were broken through physical abuse, it would not start a fire or explosion because the spark is suppressed by the surrounding nitrogen atmosphere.

The optical system should be noted in cooperation with the illumination system. The openings 76 and 83 have the same azimuth. The focus of the optical system is more narrow than the beam of illumination. That is, the maximum field of view through the optical system is fully illuminated by the light from the lamp 73. It has a greater angle of divergence. This divergence assures that there are no dark spots subject to poor illumination on using the optical system. The device is adapted to be inserted through a relatively small diameter opening. Typically, the embodiment shown in FIG. 3 is manufactured to a maximum OD of about one inch. This defines a mechanism whereby the internal structural components of closed machinery can be inspected. A suitable plug is removed to obtain access through an opening of about one inch in diameter or perhaps greater if available. The length of the device enables both openings 76 and 83 to be positioned deeply in the inspected apparatus. It enables the device to be canted presuming the opening in the machinery is sufficiently large. The size of the device enables the interior of the meter run shown in FIG. 1 to be inspected. Moreover, all of this is accomplished with substantial illumination and yet is done with safety. The safety factor is particularly important in inspecting the orifice plate 15. The pipeline is exposed to explosive materials and indeed, if it is a natural gas pipeline, can be filled with flamable natural gas. Once the pressure in this area is reduced and oxygen is permitted to flow into the pipeline, the degree of risk becomes even higher by virtue of the fact that oxygen supports an explosive atmosphere.

The foregoing is directed to the preferred embodiment. The scope, however, is determined by the claims which follow.

I claim:

1. An inspection apparatus for visual inspection of the interior of poorly illuminated machinery through a small opening into the machinery, comprising:
   (a) an elongate housing having
      (1) an optical system therein,
      (2) a viewable field opening,
      (3) an eye piece to enable viewing of a specified field width,
      (4) wherein the optical system forms a view at the eye piece of specified field determined by the azimuthal direction of the opening
   (b) closed chamber means in said housing;
   (c) light forming means in said chamber means;
   (d) light directing means supported by said housing and located to direct light from said chamber means away from said housing and in an azimuthal direction to illuminate the field viewed by said optical system;
   (e) wherein said housing has means to isolate said light forming means from the exterior outside said closed chamber means;
   (f) wherein said light forming means and said chamber means are connected through a flow line to a source of nonflammable gas to establish an atmosphere of nonflammable gas surrounding said light forming means.

2. The apparatus of claim 1 including a separate battery pack connected by conductors extending from said battery pack to said housing for connection with said light forming means.

3. The apparatus of claim 2 further including means for introducing an inert nonexplosive gas into said battery pack to establish a nonexplosive atmosphere therein.

4. The apparatus of claim 3 including a hollow tubing extending to said battery pack for delivery of nonexplosive gas thereto and also including means for sealing around said battery pack to confine the nonexplosive gas on the interior thereof.

5. The apparatus of claim 4 wherein said battery pack includes a flashlight housing having a switch on the exterior thereof, and means sealing over said switch to isolate said switch within an explosion proof housing.

6. The apparatus of claim 6 wherein said switch is operated through said explosion proof housing by means extending through said explosion proof housing for switch manipulation.

7. The apparatus of claim 1 wherein the optical system incorporates an exposed eye piece for viewing therethrough, and an end located mirror to direct the view of the optical system along a specified azimuth with a field of vision defined by the optical system and means for fixably mounting said optical system within said elongate housing, and further including means for adjusting the focal length of the optical system.

8. The apparatus of claim 7 further wherein said end located mirror is viewed by said optical system and is angled for directing the line of view along a specified azimuth extending from said elongated housing.

9. The apparatus of claim 8 including a second mirror for directing light from said light forming means along an azimuth in common with the azimuth of said angled mirror.

10. An inspection apparatus for visual inspection of the exterior of poorly illuminated machinery through a small opening into the machinery, comprising:
   (a) an elongate housing having
      (1) an optical system therein,
      (2) a viewable field opening,
      (3) an eye piece to enable viewing of a specified field width,
      (4) wherein the optical system forms a view at the eye piece of specified field determined by the azimuthal direction of the opening
   (b) closing chamber means in said housing;
   (c) light forming means in said chamber means;
   (d) light directing means supported by said housing and located to direct light from said chamber means away from said housing and in an azimuthal direction to illuminate the field viewed by said optical system;
   (e) a separate battery pack connected by conductors extending from said battery pack to said housing for connection with said light forming means;
   (f) wherein said housing has means to isolate said light forming means from the exterior outside said closed chamber means; and
   (g) wherein said light forming means and said chamber means are connected through a flow line to a source of nonflammable gas to establish an atmosphere of nonflammable gas surrounding said light forming means.

11. The apparatus of claim 10 wherein said elongate housing encloses said close chamber means, and further including a laterally directed hole in said housing means, and reflective means cooperative with said hole and said light forming means to direct light through said hole along a specified azimuth relative to said housing.

12. The apparatus of claim 11 wherein said light forming means is a light bulb, and said closed chamber means includes an optically clear chamber closing lens directing light toward said reflective means, from said light bulb through said opening.

13. An inspection apparatus for visual inspection of the exterior of poorly illuminated machinery through a small opening into the machinery, comprising:
   (a) an elongate housing having
      (1) an optical system therein,
      (2) a viewable field opening,
      (3) an eye piece to enable viewing of a specified field width,
      (4) wherein the optical system forms a view at the eye piece of specified field determined by the azimuthal direction of the opening
   (b) closed chamber means in said housing;
   (c) light forming means in said chamber means;
   (d) light directing means supported by said housing and located to direct light from said chamber means away from said housing and in an azimuthal direction to illuminate the field viewed by said optical system;
   (e) a separate battery pack connected by conductors extending from said battery pack to said housing for connection with said light forming means; and
   (f) means for introducing an inert nonexplosive gas into said battery pack to establish a nonexplosive atmosphere therein.

14. The apparatus of claim 13 including a hollow tubing extending to said battery pack for delivery of nonexplosive gas thereto and also including means for sealing around said battery pack to confine the nonexplosive gas on the interior thereof.

15. The apparatus of claim 14 wherein said battery pack includes a flashlight housing having a switch on the exterior thereof, and means sealing over said switch to isolate said switch within an explosion proof housing.

16. The apparatus of claim 15 wherein said switch is operated through said explosion proof housing by means extending through said explosion proof housing for switch manipulation.

17. The apparatus of claim 16 wherein the optical system incorporates an exposed eye piece for viewing therethrough, and an end located mirror to direct the view of the optical system along a specified azimuth with a field of vision defined by the optical system and means for fixably mounting said optical system with said elongate housing, and further including means for adjusting the focal length of the optical system.

* * * * *